US012502685B1

(12) United States Patent
Nie

(10) Patent No.: US 12,502,685 B1
(45) Date of Patent: Dec. 23, 2025

(54) DETACHABLE SPRAYING MACHINE

(71) Applicant: NINGBO SHELL MACHINERY CO., LTD, Zhejiang (CN)

(72) Inventor: Xuefeng Nie, Zhejiang (CN)

(73) Assignee: NINGBO SHELL MACHINERY CO., LTD, Zhejiang (CN)

( * ) Notice: Subject to any disclaimer, the term of this patent is extended or adjusted under 35 U.S.C. 154(b) by 0 days.

(21) Appl. No.: 19/282,888

(22) Filed: Jul. 28, 2025

(30) Foreign Application Priority Data

Oct. 29, 2024 (CN) ........................ 202422619660.X

(51) Int. Cl.
*B05B 15/18* (2018.01)
*B05B 15/62* (2018.01)
*B05B 15/65* (2018.01)

(52) U.S. Cl.
CPC .............. *B05B 15/18* (2018.02); *B05B 15/62* (2018.02); *B05B 15/65* (2018.02)

(58) Field of Classification Search
CPC ......... B05B 1/185; B05B 15/18; B05B 15/62; B05B 15/65
USPC .................................................. 239/591, 600
See application file for complete search history.

(56) References Cited

U.S. PATENT DOCUMENTS 3,416,732 A * 12/1968 Reiter ...................... F03B 13/00 239/227
3,711,026 A * 1/1973 Heinrich ................. B05B 3/066 239/227
4,214,705 A * 7/1980 Watts ......................... B08B 9/08 239/227
5,579,787 A * 12/1996 Wood .................... B08B 9/0936 239/246
10,105,740 B2 * 10/2018 Hoffmeyer .............. B05B 15/65
11,465,164 B1 * 10/2022 Hagberg .............. A01C 23/047
2021/0129190 A1 * 5/2021 Qiao ........................ F04B 53/16
2025/0121396 A1 * 4/2025 Kocer ................... B05B 13/005

* cited by examiner

*Primary Examiner* — Steven J Ganey
(74) *Attorney, Agent, or Firm* — Hawaii Patent Services; Nathaniel K. Fedde; Kenton N. Fedde

(57) ABSTRACT

The present invention relates to a detachable spraying machine, including a front end cover, a drive motor, a pump assembly, a reduction gearbox, an eccentric shaft, an eccentric bearing, and a slide mechanism. The slide mechanism includes a sliding member and a detachable pressure plate. The pressure plate and the front end cover form a track, and the sliding member slides in the track. The drive motor drives the eccentric bearing via the reduction gearbox and the eccentric shaft. The rotary motion is converted into reciprocating motion through the opening of the sliding member, driving the plunger rod of the pump assembly to work.

20 Claims, 10 Drawing Sheets

DETACHABLE SPRAYING MACHINE

CROSS-REFERENCE TO RELATED APPLICATIONS

This application claims priority to Chinese Utility Model patent application No. 202422619660.X, filed on Oct. 29, 2024, titled "A Detachable Spraying Machine," the entire content of which, including any amendments, is incorporated herein by reference.

TECHNICAL FIELD

The present invention relates to the field of spraying machine technology, and specifically to a detachable spraying machine.

BACKGROUND

Spraying machines can be used for pumping paint or other solutions, such as water, oil, and solvents; these spraying machines include a pump driver connected to a pump assembly and enclosed by a housing and a front cover. The pump driver converts the motion generated by the motor into pumping motion. In the prior art, the pump drive device is the main component that drives the pump body and is prone to damage. Therefore, in order to repair the components of the pump drive device, the entire machine needs to be replaced, which increases costs.

Existing paint spraying machine slide mechanisms cannot be quickly disassembled, which to some extent increases maintenance costs, and downtime for repairs also incurs additional expenses.

Therefore, it is necessary to propose a new type of spraying machine to solve the above technical problems.

SUMMARY

The present invention provides a detachable spraying machine to solve the problems raised in the background art.

To achieve the above inventive objective, the present invention adopts the following technical solution:

A detachable spraying machine, including: a front end cover; a drive motor, the drive motor is set on one side of the front end cover; a pump assembly, the pump assembly is set on the side of the front end cover away from the drive motor; a reduction gearbox, set between the drive motor and the front end cover, and transmission connected to the drive motor; an eccentric shaft, transmission connected to the output end of the reduction gearbox; an eccentric bearing, installed on the eccentric part of the eccentric shaft; a slide mechanism, including a sliding member and a pressure plate detachably installed on the front end cover. A track is formed between the pressure plate and the front end cover, and the sliding member is slidably set in the track; wherein, the middle of the sliding member is provided with an opening, and the eccentric bearing is accommodated in the opening and contacts the inner wall of the opening; when the drive motor starts, the eccentric shaft drives the eccentric bearing to perform eccentric circular motion, and through the constraint of the inner wall of the opening on the eccentric bearing, drives the sliding member to perform linear reciprocating motion along the track; the pump assembly is detachably installed on the front end cover, and the plunger rod of the pump assembly is transmission connected to the sliding member, and the sliding member drives the plunger rod to perform linear reciprocating motion.

The beneficial effects of the present invention compared to the prior art are:

Through the detachable installation of the slide mechanism and the front end cover, users can quickly disassemble the spraying machine pump body and the sliding member, which not only improves the convenience of maintenance and operational flexibility of the spraying machine, but also enables the replacement and repair of the slide mechanism or pump assembly to be easily completed without disassembling the entire spraying machine, significantly reducing maintenance costs and time costs.

BRIEF DESCRIPTION OF DRAWINGS

The drawings, which constitute a part of this application, are used to provide a further understanding of the present invention. The schematic embodiments of the present invention and their descriptions are used to explain the present invention and do not constitute undue limitations on the present invention. In the drawings.

Figure 1:
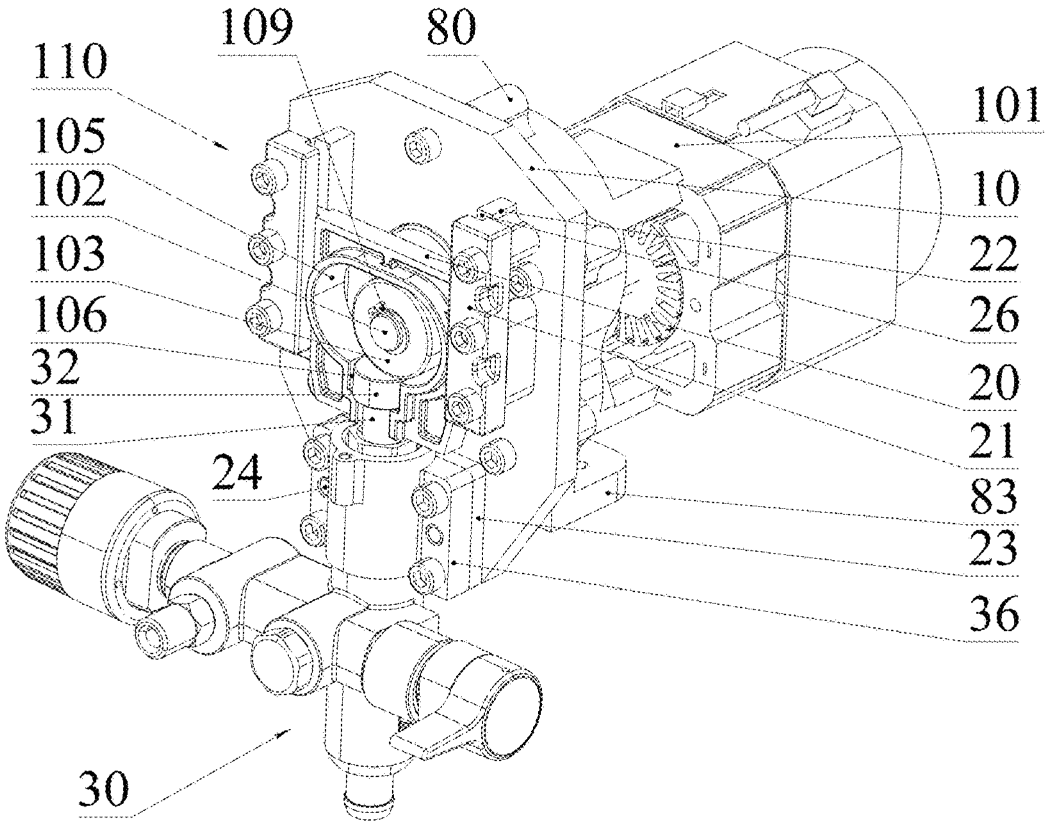
FIG. 1 is a schematic perspective view of an embodiment provided by the present invention.

Reference signs: front end cover (10); sliding member (20); pressure plate (21); locking boss (22); mounting base (23); positioning protrusion (24); avoidance groove (25); track (26); pump assembly (30); plunger rod (31); top sleeve (32); card base (36); sealing sleeve (39); reduction gearbox (80); fixing plate (81); support part (83); bolt (97); fixing hole (99); drive motor (101); eccentric shaft (102); eccentric bearing (103); opening (105); guide groove (106); retaining ring (109); slide mechanism (110).

DESCRIPTION OF EMBODIMENTS

The technical solutions in the embodiments of the present invention will be clearly and completely described below in conjunction with the accompanying drawings. Obviously, the described embodiments are part of the embodiments of the present invention, not all of them. The following description of at least one exemplary embodiment is illustrative in nature and is by no means intended to limit the invention, its application, or use. All other embodiments obtained by those skilled in the art based on the embodiments in the present invention without creative efforts shall fall within the protection scope of the present invention.

It should be noted that the terms used herein are only for describing specific embodiments and are not intended to limit the exemplary embodiments according to the present application. As used herein, unless the context clearly dictates otherwise, singular forms are also intended to include plural forms, and it should also be understood that when the terms "comprise" and/or "include" are used in this specification, they indicate the presence of features, steps, operations, devices, components, and/or combinations thereof.

Unless otherwise specifically stated, the relative arrangement, numerical expressions, and numerical values of the components and steps set forth in these embodiments do not limit the scope of the present invention. At the same time, it should be understood that for the convenience of description, the dimensions of the various parts shown in the drawings are not drawn to actual proportions. Technologies, methods, and equipment known to those of ordinary skill in the relevant art may not be discussed in detail, but where appropriate, such technologies, methods, and equipment should be considered as part of the authorized specification. In all examples shown and discussed herein, any specific value should be interpreted as exemplary and not as limiting. Therefore, other examples of exemplary embodiments may have different values. It should be noted that similar reference numerals and letters in the following drawings indicate similar items, and therefore, once an item is defined in one drawing, it does not need to be discussed further in subsequent drawings.

Figure 9:
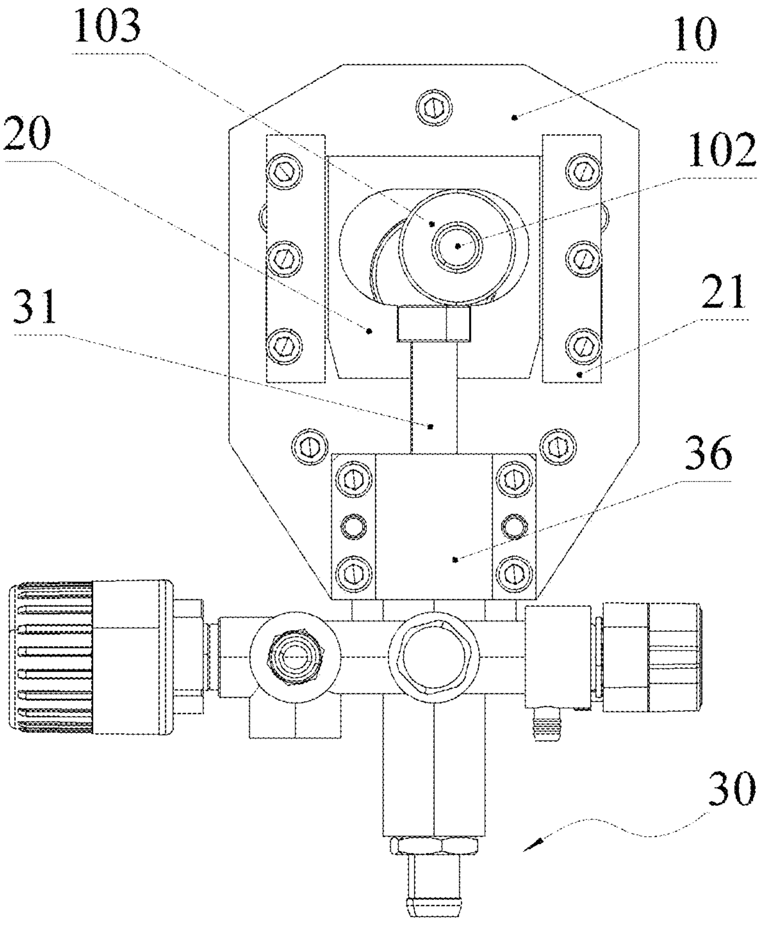
FIG. 9 is a front view of the embodiment shown in FIG. 1.
Figure 10:
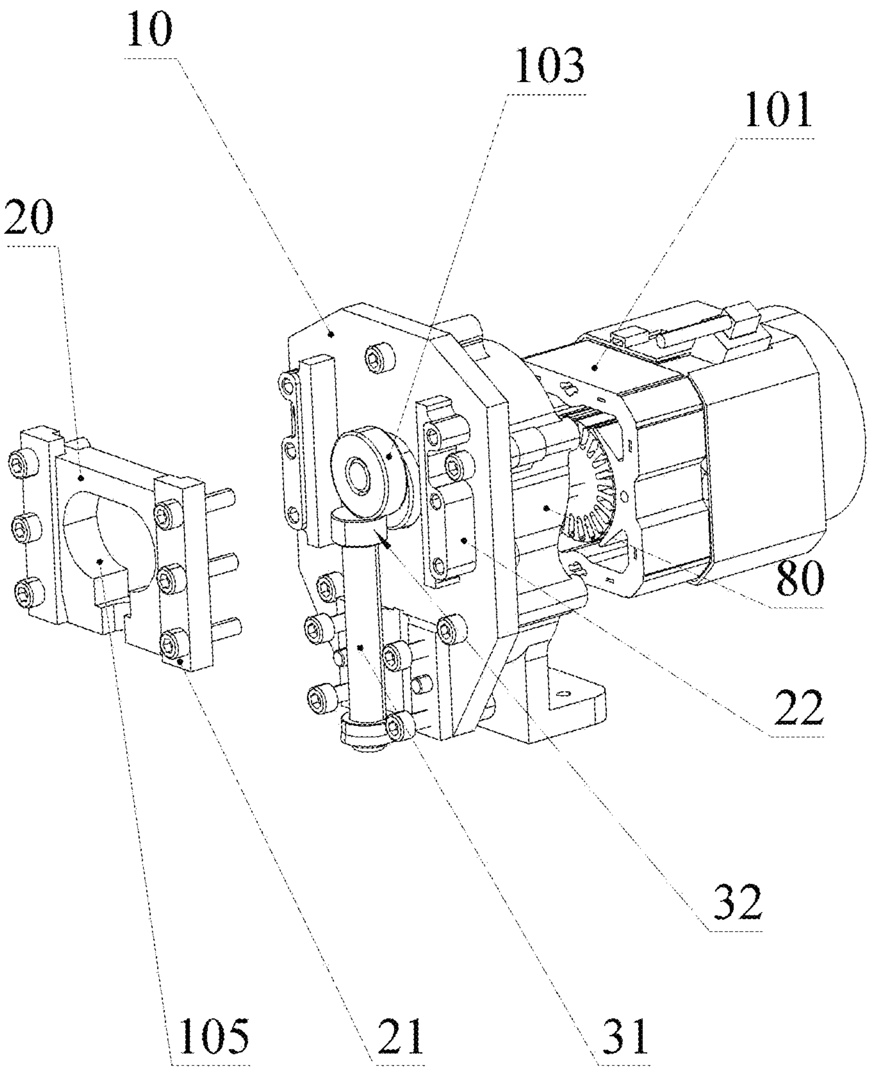
FIG. 10 is an exploded schematic diagram of the front cover plate and the slide mechanism in the embodiment shown in FIG. 1.

A detachable spraying machine, please refer to FIGS. 1 and 9, includes a front end cover 10, a pump assembly 30, and a drive motor 101. The drive motor 101 is set on one side surface of the front end cover 10, and the pump assembly 30 is set on the side surface of the front end cover 10 away from the drive motor 101.

Figure 6:
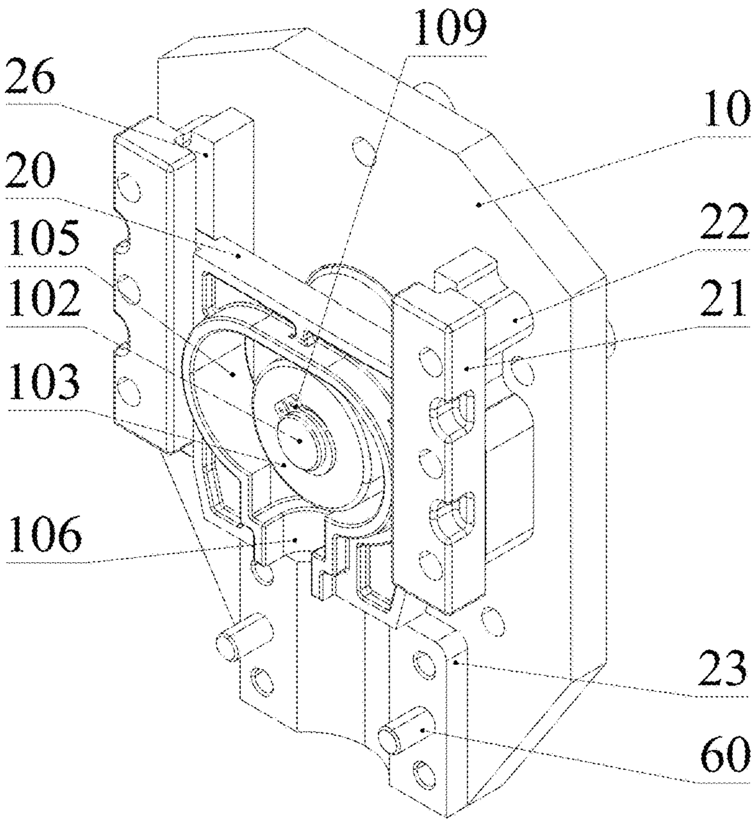
FIG. 6 is a schematic structural view of the front end cover in the embodiment shown in FIG. 1.
Figure 11:
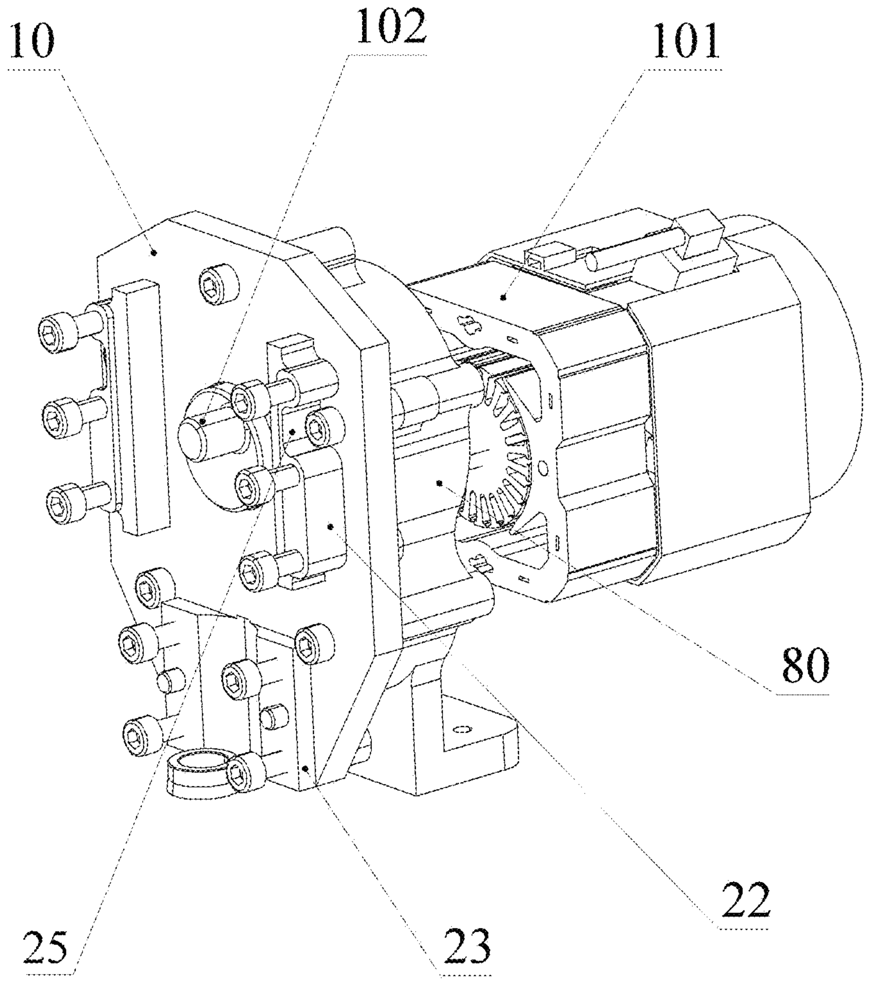
FIG. 11 is a schematic structural diagram of the eccentric shaft in the embodiment shown in FIG. 1.

In this embodiment, please refer to FIGS. 1, 6, and 11, the drive motor 101 is provided with a reduction gearbox 80. The reduction gearbox 80 is transmission connected to an eccentric shaft 102. The eccentric shaft 102 is provided with an eccentric bearing 103 at the end away from the reduction gearbox 80. The center line of the eccentric bearing 103 is offset relative to the center line of the eccentric shaft 102; this allows the eccentric bearing 103 to have an upward and downward movement tendency for reciprocating motion when the eccentric shaft 102 rotates; the eccentric shaft 102 is also provided with a retaining ring 109, used to hold the eccentric bearing 103 to ensure stable operation of the eccentric bearing 103; the reduction gearbox 80 is located between the front end cover 10 and the drive motor 101, effectively improving transmission efficiency; specifically, the reduction gearbox 80, as a key component controlling power speed transmission, is transmission connected to the drive motor 101, converting the high-speed, low-torque power generated by the drive motor 101 into low-speed power that meets work requirements through transmission connection.

Figure 12:
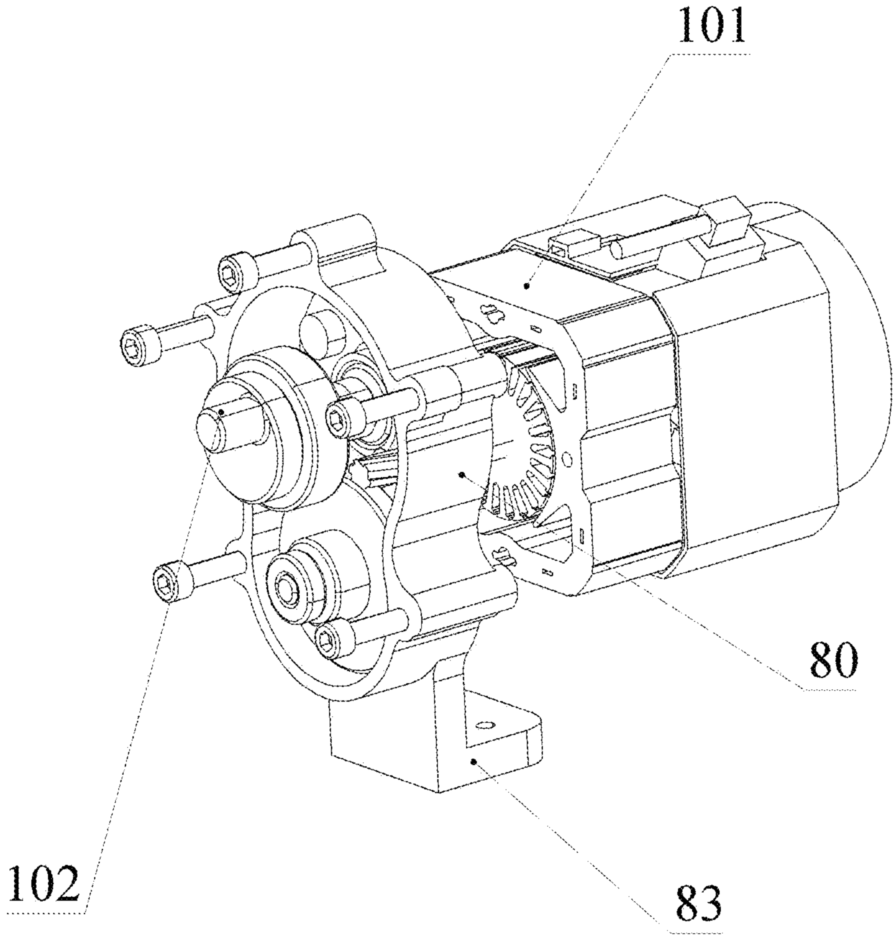
FIG. 12 is a schematic structural diagram of the inside of the reduction gearbox in the embodiment shown in FIG. 1.
Figure 13:
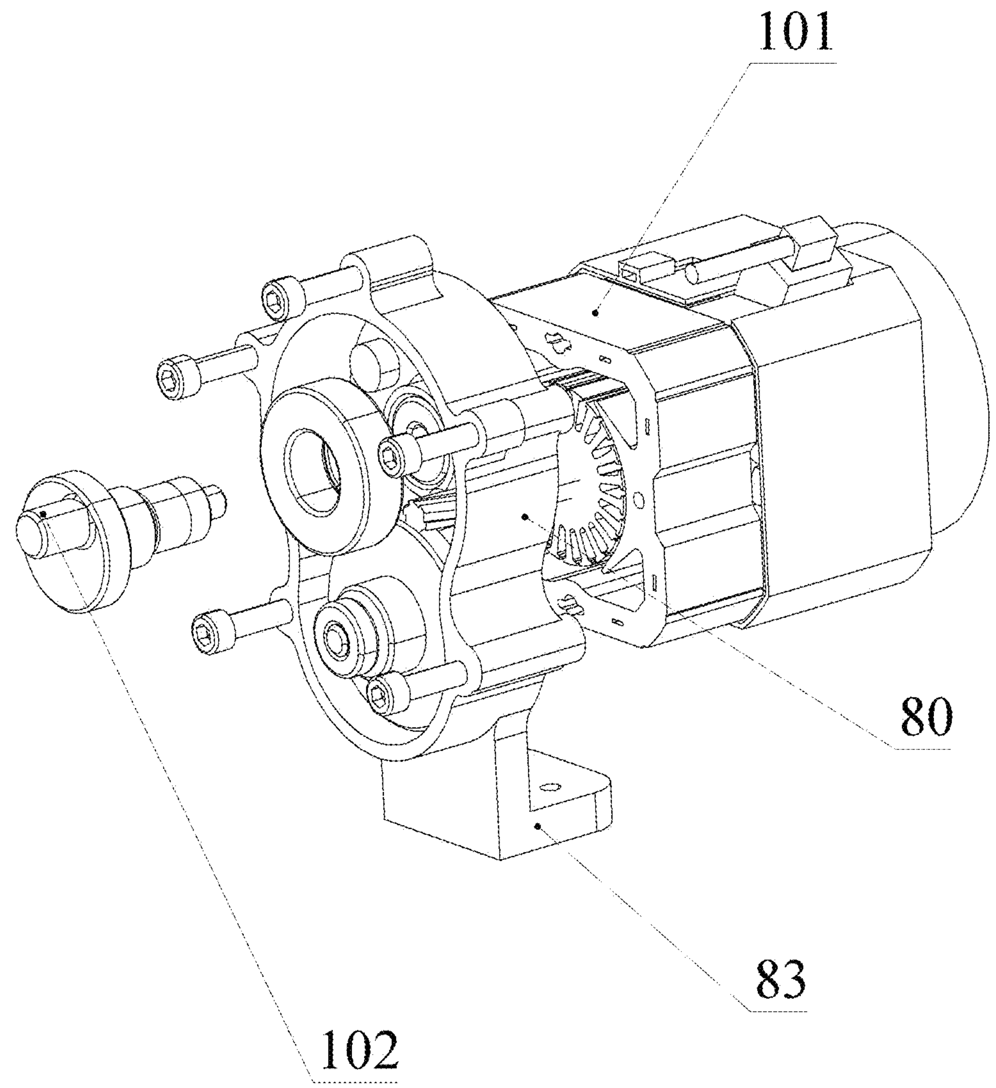
FIG. 13 is an exploded schematic diagram of the eccentric shaft and the reduction gearbox in the embodiment shown in FIG. 12.

In other embodiments, please refer to FIGS. 12 and 13, the output shaft of the drive motor 101 is connected to the eccentric bearing 103.

In other embodiments, a stroke conversion gear set is added between the eccentric shaft 102 and the reduction gearbox 80. By switching different gear ratios through a shift fork, three modes of "high-speed short stroke," "medium-speed medium stroke," and "low-speed long stroke" can be achieved.

In other embodiments (not shown in the figures), the reduction gearbox 80 can be detachably installed on the front cover 10 plate with screws, which facilitates the replacement and maintenance of the reduction gearbox 80 by staff.

In other embodiments (not shown in the figures), the reduction gearbox 80 can be divided into a front cover and a rear cover, and the front cover and the rear cover are installed with screws. Compared with integral casting or machining a complex-shaped complete box, dividing the box into two parts, front and rear, can greatly simplify the design and manufacturing difficulty of casting molds or machining fixtures; at the same time, during assembly or maintenance, the front cover and the rear cover can be opened at any time to conveniently check gear meshing conditions, bearing clearance, sealing status, etc., and make necessary adjustments.

In other embodiments, please refer to FIGS. 1 and 6, the eccentric shaft 102 is also provided with a retaining ring 109, used to hold the eccentric bearing 103, allowing the eccentric bearing 103 to operate stably. Compared with bolt fixing and other methods, the retaining ring can be quickly installed through grooves, which can shorten the installation time of the eccentric bearing 103, and can be disassembled without additional tools, significantly improving assembly and maintenance efficiency.

In other embodiments (not shown in the figures), the eccentric shaft 102 adopts a hollow structure design, and an axially extending lubrication oil passage is provided inside, and the end of the lubrication oil passage communicates with the installation position of the eccentric bearing 103. This structure allows lubricating oil to be injected into the interior through an oil nozzle, realizing continuous lubrication of the eccentric bearing 103, reducing friction loss and extending service life; at the same time, the hollow structure can reduce the overall weight of the eccentric shaft 102, reduce the load on the drive motor 101, and improve operational stability. In addition, the surface of the eccentric shaft 102 can be treated with a nitriding process to form a hardened layer with a hardness of HV500 or more, enhancing its wear resistance and fatigue resistance.

In other embodiments (not shown in the figures), an overload protection device is added inside the reduction gearbox 80: a torque limiter is set at the connection between the output shaft and the eccentric shaft 102. When the load torque exceeds a set threshold (e.g., 1.5 times the rated torque), the torque limiter will automatically cut off the power transmission, avoiding gear tooth breakage or motor burnout due to slippage inside the gearbox. This device can adjust the trigger threshold by adjusting the spring preload to adapt to different working conditions, and does not require disassembling the equipment during recovery, only resetting the knob to re-engage the transmission, greatly reducing fault maintenance costs.

In other embodiments, please refer to FIG. 1, the reduction gearbox 80 is connected to the front end cover 10 by bolts; the reduction gearbox 80 can also adopt other connection methods, such as welding or snap fitting.

In other embodiments, please refer to FIGS. 2 and 5, in other embodiments, a support part 83 is provided below the reduction gearbox 80, used to stably support the entire spraying machine, ensuring that the pump assembly 30 and the drive motor 101 remain stable during operation. The support part 83 is integrally formed with the reduction gearbox 80, enhancing the reliability of the overall structure.

Figure 5:
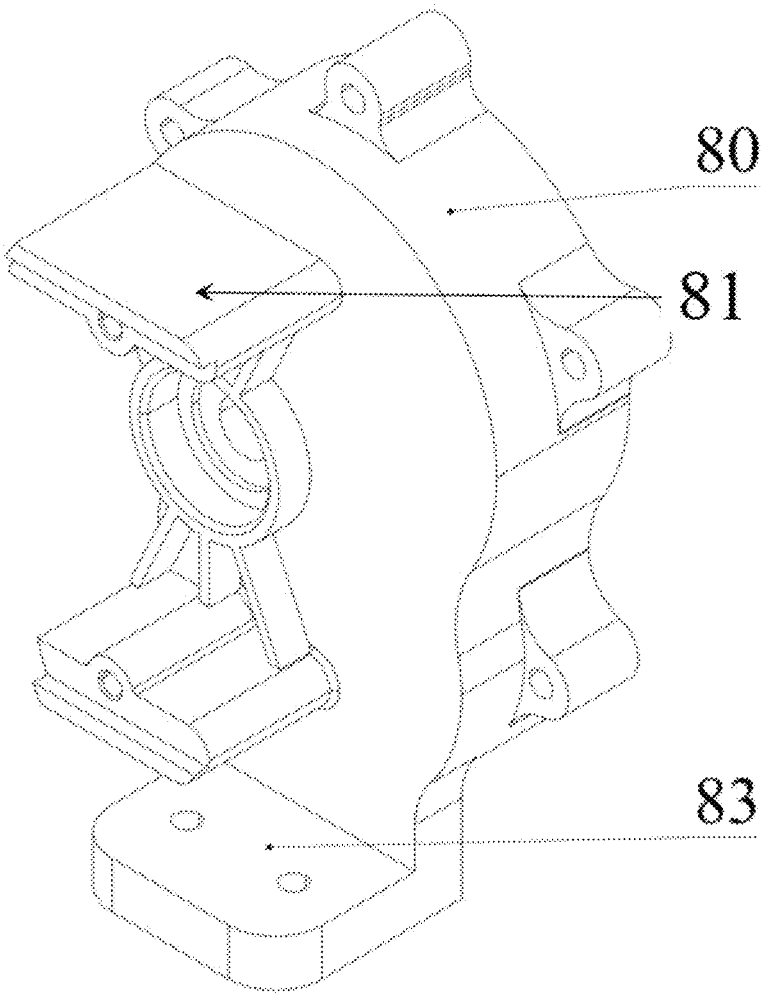
FIG. 5 is a schematic structural view of the reduction gearbox in the embodiment shown in FIG. 1.

In other embodiments, please refer to FIG. 5, multiple mounting holes are provided on the surface of the support part 83, enabling it to be flexibly and stably connected to various mobile devices via screws. This not only provides adjustable mounting positions to adapt to different equipment layouts, but also ensures the rigidity and reliability of the connection, effectively transmitting loads and suppressing vibrations during operation, while the screw connection method also facilitates equipment assembly, disassembly, and maintenance.

Figure 2:
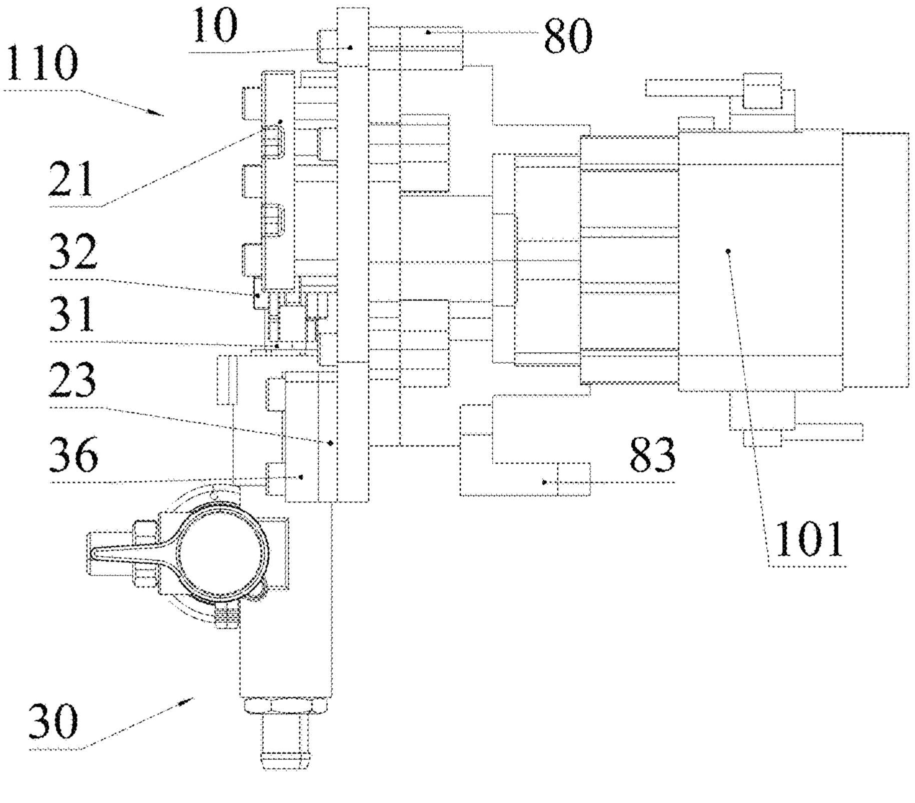
FIG. 2 is a side structural view of the embodiment in FIG. 1.

In other embodiments, please refer to FIGS. 2 and 5, a U-shaped fixing plate 81 is fixedly installed on the side of the reduction gearbox 80 facing the drive motor 101. The fixing plate 81 is placed vertically, and a central hole communicating with the reduction gearbox 80 is fixedly installed in the center of the fixing plate 81. When the output end of the drive motor 101 is installed inside the reduction gearbox 80, it can limit and support the top and bottom of the drive motor 101.

In this embodiment, please refer to FIGS. 1, 3, 6, and 10, a slide mechanism 110 is provided on the side of the front end cover 10 facing the pump assembly 30. The drive motor 101 is transmission connected to the slide mechanism 110. The slide mechanism 110 is used to convert the rotary motion of the drive motor 101 into reciprocating motion.

Figure 3:
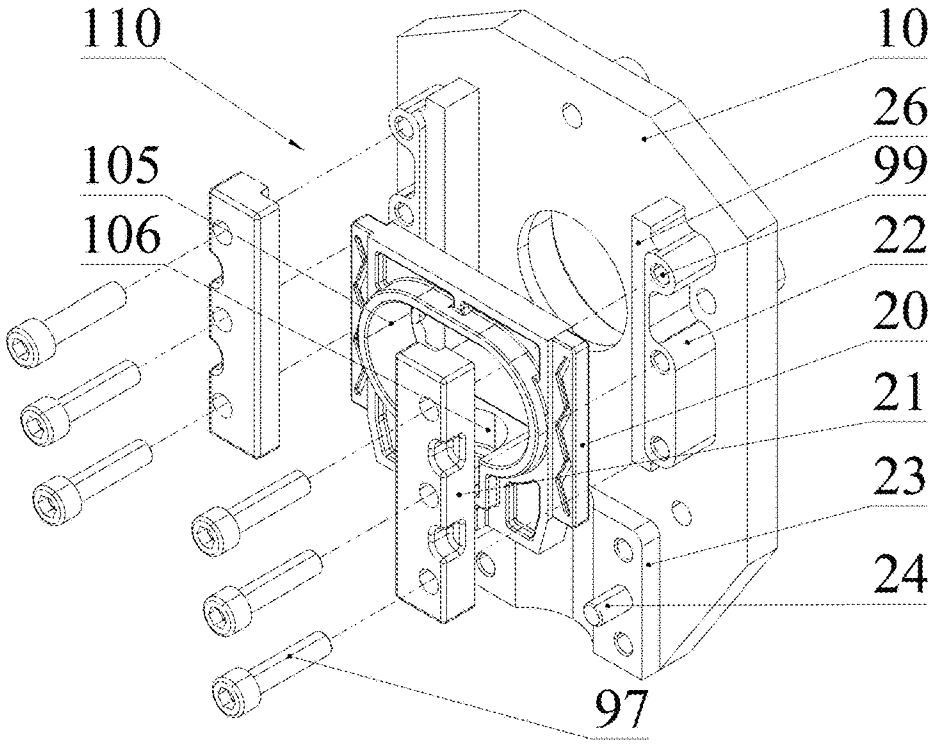
FIG. 3 is a schematic diagram of the connection between the slide mechanism and the front end cover in the embodiment shown in FIG. 1.

In other embodiments, please refer to FIG. 3, the slide mechanism 110 includes a sliding member 20 and a pressure plate 21 detachably installed on the front end cover 10. The number of pressure plates 21 is two, and they are symmetrically distributed along the sliding member 20. A gap is left between the pressure plate 21 and the front end cover 10, thereby forming a track 26. The two ends of the sliding member 20 extend into and slide in the track 26. The track 26 strictly constrains the degrees of freedom of movement of the sliding member 20, so that the sliding member 20 can only perform linear sliding along the track direction (i.e., parallel to the direction of the pressure plate 21), preventing deflection or disengagement; wherein, when the pressure plate 21 is disassembled, since the sliding member 20 slides in the track 26 and there is no fixed connection between the two, staff can directly remove the sliding member 20 without disassembling the front end cover 10 or other associated parts, which facilitates rapid on-site maintenance.

In other embodiments, the component cooperating with the front cover plate 10 is not limited to the pressure plate 21, and can be set as a guide block or a split guide rail frame.

In other embodiments, please refer to FIGS. 3 and 6, an elliptical opening 105 is provided in the middle of the sliding member 20, and its short axis direction is parallel to the pressure plate 21. The eccentric bearing 103 is set in the opening 105 and contacts the inner wall of the opening 105. The short axis of the opening 105 is parallel to the pressure plate 12.

After the drive motor 101 starts, it drives the eccentric shaft 102 to rotate, and the eccentric bearing 103 installed on the eccentric part of the eccentric shaft 102 performs eccentric circular motion (revolution) accordingly. This eccentric bearing 103 is housed inside the elliptical opening 105 provided in the middle of the sliding member 20, and its outer ring always maintains contact with the inner wall of the opening 105. When the eccentric bearing 103 revolves, the trajectory of its circular motion is forcibly constrained by the specific contour of the elliptical opening (the long axis provides swing space, and the short axis limits displacement), thereby converting the radial component of the bearing's rotational motion into a linear driving force for the sliding member 20, generating a continuous pushing and pulling action. At the same time, the two ends of the sliding member 20 are precisely limited in the track 26 formed by the gap between the detachable pressure plate 21 and the front end cover 10. Under the strict linear guiding constraint of the track 26, the periodic linear driving force applied by the eccentric bearing 103 ultimately drives the sliding member 20 to perform linear reciprocating motion parallel to the pressure plate 21 (i.e., along the direction of the track 26).

In other embodiments (not shown in the figures), the track 26 of the slide mechanism 110 can be replaced with a linear guide rail assembly, which includes a guide rail seat fixed to the front end cover 10 and a slider integrally formed with the sliding member 20, and the slider and the guide rail seat cooperate by rolling balls. Compared with traditional gap tracks, the guiding accuracy of linear guide rails can be improved to 0.02 mm/m, and the sliding resistance is reduced by more than 30%, which can significantly reduce the jamming phenomenon during reciprocating motion of the sliding member 20 and improve the output pressure stability of the pump assembly 30. At the same time, limit blocks are provided at both ends of the guide rail seat to prevent the sliding member 20 from disengaging from the track due to overload, improving equipment safety.

In this embodiment, please refer to FIG. 3, the front end cover 10 is provided with two locking bosses 22. The locking bosses 22 are symmetrically distributed on the front end cover 10. As shown in FIG. 3, these two locking bosses 22 maintain the same shape, size, and installation position, which can provide a more reliable and stable locking effect. This symmetry further improves the structural compactness of the front end cover 10.

In other embodiments, please refer to FIG. 6, the locking bosses 22 fit with the pressure plate 21, and the fitting parts of the locking bosses 22 and the pressure plate 21 are dimensionally matched, enabling alignment and tight abutment with corresponding structures on the pressure plate 21.

In other embodiments, please refer to FIG. 6, the track 26 is formed by the gap between the pressure plate 21 and the front end cover 10. The sliding member 20 is detachably installed in this track 26 and slides along it. The function of the locking boss 22 is to fix the position of the pressure plate 21, rather than directly participate in forming the track gap. Through the precise guiding provided by the track 26, the sliding member 20 can achieve the desired linear displacement, thereby effectively converting the rotary motion of the drive motor 101 into reciprocating motion.

In other embodiments, please refer to FIGS. 3 and 6, the locking bosses 22 are provided with multiple fixing holes 99 (in the present invention, six fixing holes 99 are provided to ensure sufficient stability and strength during assembly); the pressure plate 21 is installed with bolts 97: through-holes are opened on the pressure plate 21 corresponding to the positions of the fixing holes 99; during installation, the bolts 97 pass through the through-holes of the pressure plate 21 and are screwed into the fixing holes 99 of the locking bosses 22. The preload force generated by the bolts 97 creates a strong clamping force between the contact surfaces of the pressure plate 21 and the locking bosses 22, ensuring a firm and non-loosening connection, significantly improving the stability of the abutment and the overall reliability. At the same time, the bolted connection method also facilitates subsequent rapid disassembly and maintenance.

In other embodiments, the locking bosses 22 and the pressure plate 21 can be connected by other disassembly methods such as snap structures.

In this embodiment, please refer to FIGS. 1, 4, 7, and 8, the pump assembly 30 is located below the slide mechanism 110. The pump assembly 30 includes a plunger rod 31. The end of the plunger rod 31 away from the pump assembly 30 extends into the opening 105 in the sliding member 20.

Figure 4:
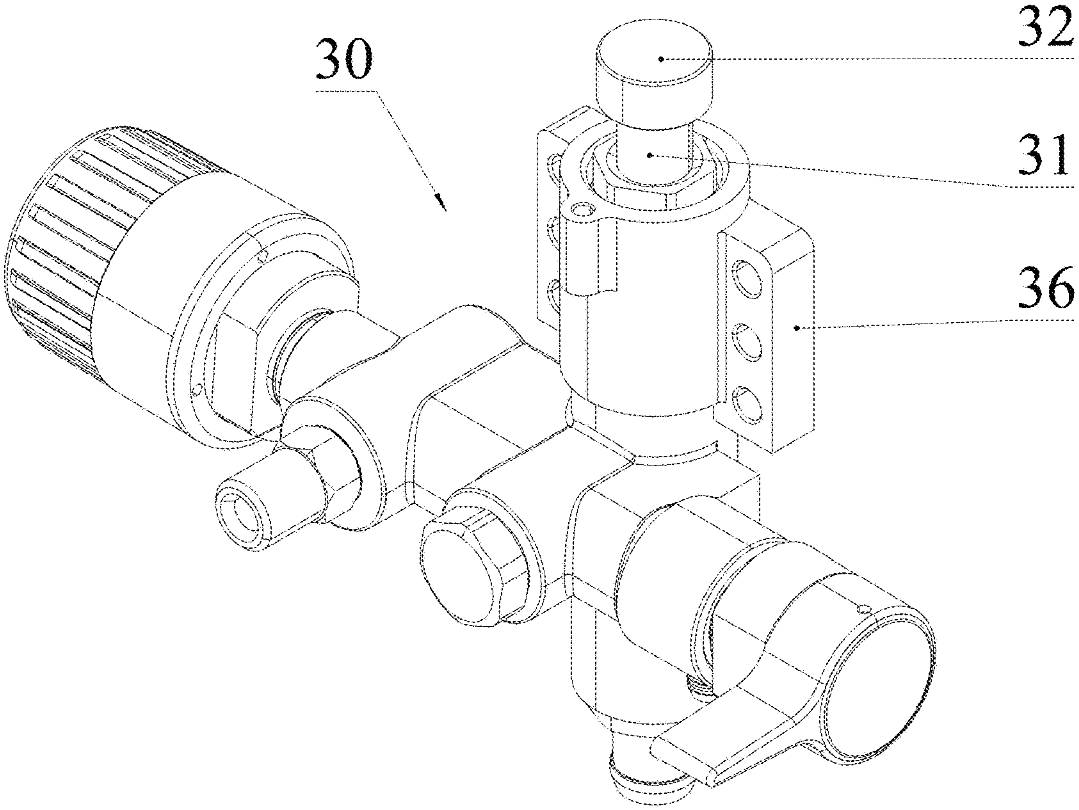
FIG. 4 is a schematic structural view of the pump assembly in the embodiment shown in FIG. 1.

In other embodiments, please refer to FIG. 4, a top sleeve 32 is provided at the end of the plunger rod 31 inside the opening, and the end of the top sleeve 32 away from the plunger rod 31 abuts against the eccentric bearing 103.

In other embodiments (not shown in the figures), a rubber pad is fixedly installed on the upper surface of the top sleeve 32. The elastic characteristics of the rubber pad can effectively absorb high-frequency micro-vibrations generated by the high-speed rotation of the eccentric bearing 103 and instantaneous impact forces during commutation, reducing the "clicking" noise of hard collisions between metals, making the equipment run quieter and smoother. At the same time, as a soft medium, rubber eliminates direct dry friction between the outer ring of the eccentric bearing 103 and the top sleeve 32, significantly reducing the risk of scratching and fatigue spalling of the contact surface even when lubrication is insufficient, simultaneously extending the service life of the bearing and the top sleeve.

In other embodiments (not shown in the figures), the top sleeve 32 can be integrally formed with the plunger rod 31, or can be set as a split type and installed to the top end of the plunger rod 31. The split type setting allows the top sleeve 32 to be removed for replacement, maintenance or adjustment. The top sleeve 32 can be set as a split type through bolts and snap structures.

In other embodiments, please refer to FIG. 6, a guide groove 106 is opened on the side of the sliding member 20 facing the pump assembly 30, and the bottom of the guide groove 106 communicates with the opening 105 that accommodates the eccentric bearing 103. The plunger rod 31 is slidably assembled in the guide groove 106. The top sleeve 32 is fixed to the end of the plunger rod 31, and its diameter is larger than the width (or cross-sectional size) of the guide groove 106, preventing it from entering the groove. When the eccentric bearing 103 drives the sliding member 20 to perform linear reciprocating motion, the sliding member 20 directly pushes (or pulls) the top sleeve 32 through the side wall of its guide groove 106, thereby forcibly driving the plunger rod 31 to perform reciprocating linear motion along the axis direction of the guide groove 106.

In other embodiments, please refer to FIG. 6, the guide groove 106 extends parallel to the direction of the pressure plate 21, and its two side walls are open and communicate with the outside. When the sliding member 20 is disassembled, the guide groove 106 can be directly moved out along its extended path during disassembly, without the need for position adjustment of the plunger rod 31, saving the movement operation of the plunger rod 31, reducing disassembly steps, and lowering operational complexity, especially facilitating rapid assembly and disassembly for maintenance. The plunger rod 31 can be disassembled without moving, which can effectively prevent alignment errors during subsequent installation due to plunger rod displacement, ensuring component assembly accuracy.

In other embodiments, a concave groove is opened on the inner bottom wall of the opening 105. The concave groove communicates with the guide groove 106 and its two sides communicate with the outside. The size of the concave groove matches the size of the top sleeve 32, and the top sleeve 32 is located inside the concave groove, so that the top sleeve 32 is completely accommodated inside the concave groove for operation, avoiding lateral swaying of the top sleeve 32 during up and down operation.

In this embodiment, please refer to FIGS. 1, 4, and 6, the pump assembly 30 is detachably installed on the front end cover 10. Specifically, the front end cover 10 is provided with a mounting base 23, and the pump assembly 30 is provided with a card base 36. The card base 36 is detachably installed on the mounting base 23. This design facilitates the assembly and maintenance of the pump assembly 30, and also improves the flexibility and adaptability of the overall structure.

Figure 7:
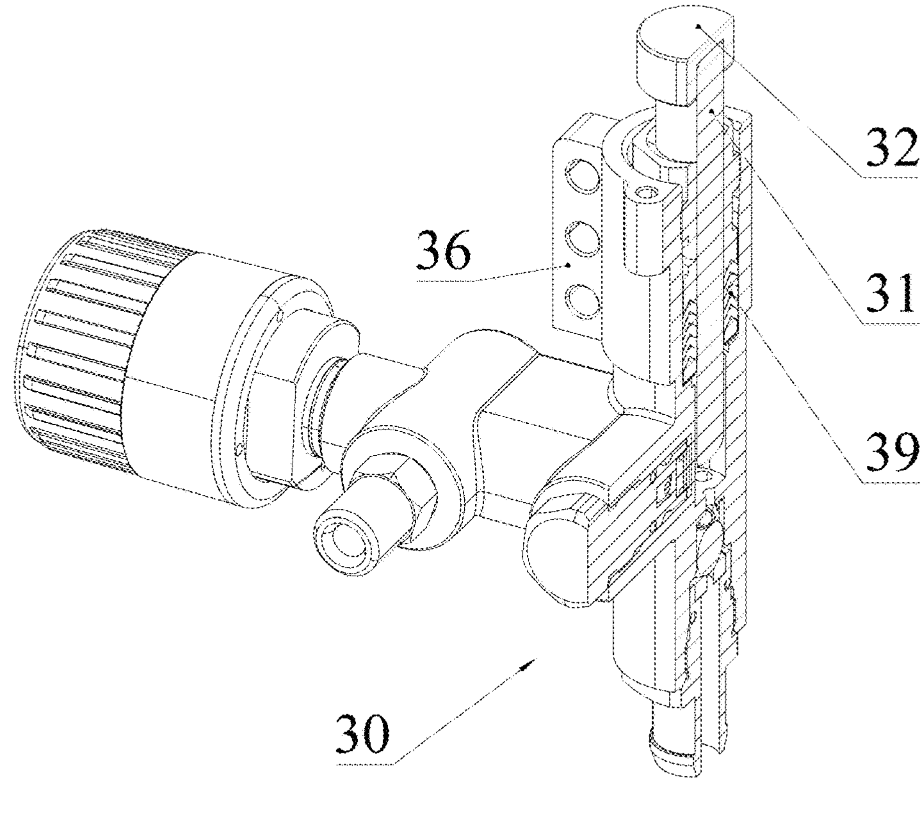
FIG. 7 is a cross-sectional view of the pump assembly in the embodiment shown in FIG. 4.
Figure 8:
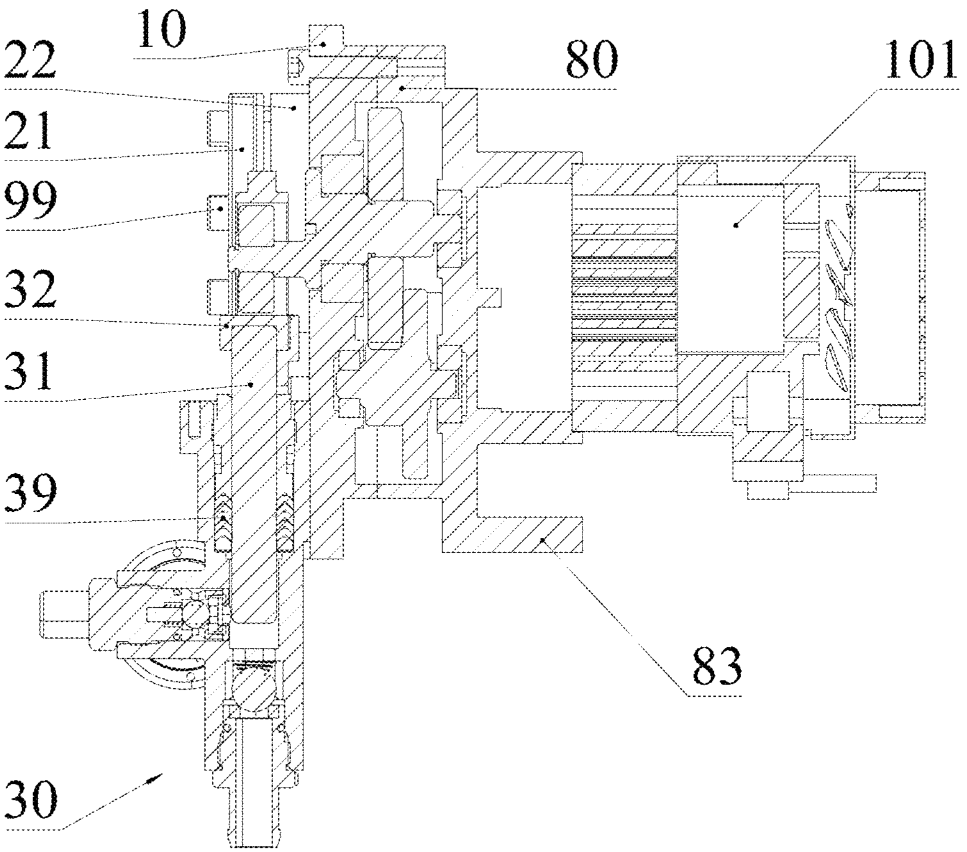
FIG. 8 is a cross-sectional view of the embodiment shown in FIG. 2.

In other embodiments, please refer to FIG. 7, the card base 36 can be composed of a connecting barrel and a mounting plate: the connecting barrel is sleeved on the plunger rod 31, and the mounting plate is detachably connected to the mounting base 23; and a curved groove is opened in the center of the mounting base 23, and its size is adapted to the connecting barrel.

In other embodiments, please refer to FIGS. 6 and 7, the connection between the card base 36 and the mounting base 23 can be securely fixed by screws, buckles or other fasteners. In the present invention, they are connected by screws.

In other embodiments, please refer to FIG. 7, a sealing sleeve 39 is provided in the connecting barrel of the card base 36, and the sealing sleeve 39 slides with the plunger rod 31; the setting of the sealing sleeve 39 can effectively block the leakage of internal media (such as liquid, gas) of the pump assembly 30 along the gap between the plunger rod 31 and the connecting barrel, avoiding performance loss or external environmental pollution due to media leakage; at the same time, the sealing sleeve 39 achieves dynamic cooperation with the sliding of the plunger rod 31, which can not only ensure the smoothness of the reciprocating motion of the plunger rod 31, but also continuously maintain the sealing effect during motion, avoiding damage to the sealing performance due to relative motion; and, by direct contact between the sealing sleeve 39 and the plunger rod 31, it can reduce direct friction between the plunger rod 31 and the inner wall of the connecting barrel, reduce the wear rate of components, and extend the service life of the plunger rod 31 and the connecting barrel.

In other embodiments (not shown in the figures), a double sealing design is adopted in the connecting barrel of the card base 36: in addition to the original sealing sleeve 39, a U-shaped sealing ring is added on the side close to the pump assembly 30, with the sealing ring lip facing the medium side. When the sealing sleeve 39 has micro-leakage due to long-term wear, the U-shaped sealing ring can self-tighten through medium pressure, forming a secondary sealing barrier, suitable for high-pressure spraying scenarios. At the same time, an annular oil storage groove is opened on the inner wall of the connecting barrel, and injecting grease into the groove can reduce dry friction between the sealing sleeve 39 and the plunger rod 31, reducing sliding resistance by 25% and extending the replacement cycle of the sealing parts.

In other embodiments, please refer to FIG. 6, the mounting base 23 is provided with more than two positioning protrusions 24 (set as two in the present invention). The positioning protrusions 24 are used to provide accurate positioning benchmarks when the card base 36 and the mounting base 23 are docked. Through clear positioning benchmarks, the alignment adjustment time during the installation of the card base 36 can be reduced, making the assembly process more convenient and efficient, especially suitable for mass production scenarios; it can ensure that the card base 36 is accurately seated in the predetermined position, avoiding component cooperation errors caused by installation deviation, and ensuring the assembly accuracy of the pump assembly 30 and the front end cover 10.

In other embodiments, please refer to FIG. 11, multiple avoidance grooves 25 are opened on the surface of the mounting base 23. In complex assemblies, there are often other components (such as screw heads or nuts) around the mounting base 23. By setting avoidance grooves 25, space is excavated on the mounting base 23 to ensure that other components can be smoothly accommodated therein, thereby achieving smooth assembly; at the same time, the design of the avoidance grooves 25 greatly reduces the overall volume of the mounting base 23, and the reduction in volume reduces raw material costs, enabling the mass production of the mounting base 23.

In this embodiment (not shown in the figures), the eccentric part of the eccentric shaft 102 adopts a split eccentric sleeve structure: the eccentric sleeve is connected to the eccentric shaft 102 by a key, and its outer circle is provided with 3 sets of mounting positions with different eccentric distances (5 mm, 8 mm, 12 mm respectively). The eccentric bearing 103 can be fixed to different mounting positions by a positioning pin. When the eccentric distance is 5 mm, the stroke distance of the plunger rod 31 is 10 mm; an eccentric distance of 8 mm corresponds to a stroke of 16 mm; and an eccentric distance of 12 mm corresponds to a stroke of 24 mm. A short stroke of 10 mm is suitable for fine spraying scenarios (such as touch-up painting on furniture surfaces). The short stroke increases the reciprocating frequency of the plunger rod to more than 1500 times/minute, and the diameter of the atomized paint particles can be controlled at 30-50 μm, improving coating uniformity by 20%; a medium stroke of 16 mm is suitable for conventional wall spraying, balancing stroke and frequency, with a flow rate of 8-10 L/h, meeting medium-area operation requirements, while avoiding equipment fatigue caused by high-frequency vibration; a long stroke of 24 mm is designed for high-viscosity coatings (such as thick-paste fire-retardant coatings). The long stroke can reduce the compression ratio per unit time and reduce the shear force of the coating in the pump chamber, avoiding flow fluctuations caused by too high viscosity. At this time, the flow rate can reach 15-20 L/h, suitable for large-area rapid construction; through the above settings, it can be applied to different working environments.

In other embodiments (not shown in the figures), replaceable limit blocks are provided at both ends of the track 26 to limit the movement distance of the sliding member 20. The thickness of the limit blocks is divided into 8 mm, 15 mm, and 22 mm, so that the effective stroke of the sliding member 20 is 12 mm, 25 mm, and 38 mm respectively (i.e., the plunger rod stroke is 12 mm, 25 mm, and 38 mm). The limit blocks are fixed to the inner side of the pressure plate 21 by screws, and the entire slide mechanism 110 does not need to be disassembled when replaced; when the plunger rod 31 has a stroke of 12 mm, it is used for high-pressure airless spraying. The short stroke quickly compresses the pump chamber, atomizing high-viscosity coatings (such as epoxy zinc-rich primer) into fine particles, improving coating adhesion; when the plunger rod 31 has a stroke of 25 mm, it is suitable for general industrial spraying, balancing stroke and frequency, with a paint output of 15-20 L/h, capable of forming a uniform medium-thickness coating on steel structures; when the plunger rod 31 has a stroke of 38 mm, it is designed for large-area rapid spraying (such as ship decks). The long stroke results in a large change in pump chamber volume, with a paint output of more than 30 L/h, and in conjunction with a low-pressure working mode, it reduces nozzle wear and extends the life of wearing parts.

In summary, as can be seen from the above description, the present invention achieves the following technical effects: through the detachable installation of the slide mechanism 110 and the front end cover 10, users can quickly disassemble the spraying machine pump body and the sliding member 20, which not only improves the convenience of maintenance and operational flexibility of the spraying machine, but also enables the replacement and repair of the slide mechanism or pump assembly to be easily completed without disassembling the entire spraying machine, significantly reducing maintenance costs and time costs.

In the description of the present invention, it should be understood that directional terms such as "front, rear, upper, lower, left, right," "horizontal, vertical, perpendicular, horizontal," and "top, bottom" generally refer to the orientations or positional relationships shown in the drawings, and are only for the convenience of describing the present invention and simplifying the description. Unless otherwise stated, these directional terms do not indicate or imply that the device or element referred to must have a specific orientation or be constructed and operated in a specific orientation, and therefore cannot be understood as a limitation on the scope of protection of the present invention; the directional terms "inner, outer" refer to the inside and outside relative to the contour of the respective components themselves.

For ease of description, spatially relative terms such as "on," "above," "on the upper surface," "upper," etc., may be used herein to describe the spatial positional relationship of one device or feature to another device or feature as shown in the figures. It should be understood that the spatially relative terms are intended to encompass different orientations in use or operation in addition to the orientation of the device described in the figures. For example, if the device in the figures is inverted, devices described as "above other devices or constructions" or "on other devices or constructions" would then be positioned "below other devices or constructions" or "under other devices or constructions." Thus, the exemplary term "above" can include both "above" and "below" orientations. The device can also be positioned in other different ways (rotated 90 degrees or at other orientations) and the spatially relative descriptions used herein interpreted accordingly.

In addition, it should be noted that the use of terms such as "first," "second," etc., to define components is for distinguishing corresponding components for convenience, and unless otherwise stated, the above terms do not have special meanings and therefore cannot be understood as a limitation on the scope of protection of the present invention.

The foregoing are merely preferred embodiments of the present invention and are not intended to limit the present invention. For those skilled in the art, the present invention may have various modifications and variations. Any modification, equivalent replacement, improvement, etc., made within the spirit and principles of the present invention shall be included within the scope of protection of the present invention.

What is claimed is:

1. A detachable spraying machine, including:

a front end cover;

a drive motor, wherein the drive motor is set on one side of the front end cover;

a pump assembly, wherein the pump assembly is set on the side of the front end cover away from the drive motor;

a reduction gearbox, set between the drive motor and the front end cover, and transmission connected to the drive motor;

an eccentric shaft, transmission connected to the output end of the reduction gearbox;

An eccentric bearing, installed on the eccentric part of the eccentric shaft; and a slide mechanism, including a sliding member and a pressure plate detachably installed on the front end cover, wherein a track is formed between the pressure plate and the front end cover, and the sliding member is slidably set in the track;

wherein, the middle of the sliding member is provided with an opening, and the eccentric bearing is accommodated in the opening and contacts the inner wall of the opening; and when the drive motor starts, the eccentric shaft drives the eccentric bearing to perform eccentric circular motion, and through the constraint of the inner wall of the opening on the eccentric bearing, drives the sliding member to perform linear reciprocating motion along the track; and The pump assembly is detachably installed on the front end cover, and the plunger rod of the pump assembly is transmission connected to the sliding member, and the sliding member drives the plunger rod to perform linear reciprocating motion.

2. The detachable spraying machine according to claim 1, wherein the detachable spraying machine is characterized in that the eccentric shaft adopts a hollow structure, and a lubrication oil passage extending axially is provided inside; the end of the lubrication oil passage communicates with the eccentric bearing installation position.

3. The detachable spraying machine according to claim 1, wherein the detachable spraying machine is characterized in that a support part is provided below the reduction gearbox, the support part is integrally formed with the reduction gearbox, and is used to stably support the entire spraying machine; and the surface of the support part is provided with multiple mounting holes, which are connected to a mobile device or a fixed surface through screws to improve stability.

4. The detachable spraying machine according to claim 1, wherein the detachable spraying machine is characterized in that the number of pressure plates of the slide mechanism is two, and they are symmetrically distributed along the sliding member.

5. The detachable spraying machine according to claim 1, wherein the detachable spraying machine is characterized in that the front end cover is provided with at least two locking bosses, the locking bosses are symmetrically distributed and fit with the pressure plate, and the fitting parts of the locking bosses and the pressure plate are dimensionally matched; and the track is formed by the gap between the pressure plate and the front end cover.

6. The detachable spraying machine according to claim 5, wherein the detachable spraying machine is characterized in that the locking bosses are provided with at least two fixing holes, and the pressure plate is detachably connected to the front end cover by bolts passing through its through-holes and screwing into the fixing holes.

7. The detachable spraying machine according to claim 1, wherein the detachable spraying machine is characterized in that the pump assembly includes a card base, and the front end cover is provided with a mounting base, and the card base is detachably installed on the mounting base, realizing the detachable connection between the pump assembly and the front end cover.

8. The detachable spraying machine according to claim 7, wherein the detachable spraying machine is characterized in that the mounting base is provided with at least two positioning protrusions for positioning the card base during installation.

9. The detachable spraying machine according to claim 7, wherein the detachable spraying machine is characterized in that the card base can be composed of a connecting barrel and a mounting plate: the connecting barrel is sleeved on the plunger rod, and the mounting plate is detachably connected to the mounting base; and a curved groove is opened in the center of the mounting base, and its size is adapted to the connecting barrel.

10. The detachable spraying machine according to claim 9, wherein the detachable spraying machine is characterized in that a sealing sleeve is provided in the connecting barrel of the card base, the sealing sleeve is sleeved on the plunger rod, and slides in cooperation with the plunger rod.

11. The detachable spraying machine according to claim 1, wherein the detachable spraying machine is characterized in that a top sleeve is provided at one end of the plunger rod near the sliding member, and the end of the top sleeve away from the plunger rod abuts against the eccentric bearing.

12. The detachable spraying machine according to claim 1, wherein the detachable spraying machine is characterized in that a guide groove is opened on the side of the sliding member facing the pump assembly, the bottom of the guide groove communicates with the opening, and the plunger rod is slidably assembled in the guide groove.

13. The detachable spraying machine according to claim 12, wherein the detachable spraying machine is characterized in that the guide groove extends parallel to the direction of the pressure plate, and its two side walls are open and communicate with the outside.

14. The detachable spraying machine according to claim 12, wherein the detachable spraying machine is characterized in that a concave groove is opened on the inner bottom wall of the opening, the concave groove communicates with the guide groove and its two sides communicate with the outside, the size of the concave groove matches the size of the top sleeve, and the top sleeve is located inside the concave groove, so that the top sleeve is completely accommodated inside the concave groove for operation.

15. The detachable spraying machine according to claim 1, wherein the detachable spraying machine is characterized in that the opening is elliptical, and the short axis direction of the elliptical opening is parallel to the extension direction of the pressure plate.

16. The detachable spraying machine according to claim 1, wherein the detachable spraying machine is characterized in that a retaining ring is provided on the eccentric shaft, and the retaining ring is used to limit the axial displacement of the eccentric bearing.

17. The detachable spraying machine according to claim 1, wherein the detachable spraying machine is characterized in that the slide mechanism includes:

a guide rail seat fixed to the front end cover; and a slider integrally formed with the sliding member, the slider and the guide rail seat cooperate by rolling balls.

18. The detachable spraying machine according to claim 1, wherein the detachable spraying machine is characterized in that the eccentric part of the eccentric shaft adopts a split eccentric sleeve structure, the eccentric sleeve is provided with at least two sets of mounting positions with different eccentric distances, and the eccentric bearing is fixed to different mounting positions by a positioning pin to adjust the stroke distance of the plunger rod.

19. The detachable spraying machine according to claim 1, wherein the detachable spraying machine is characterized in that replaceable limit blocks are provided at both ends of the track, used to limit the effective stroke of the sliding member, and the limit blocks are fixed to the inner side of the pressure plate by screws.

20. The detachable spraying machine according to claim 1, wherein the detachable spraying machine is characterized in that a U-shaped fixing plate is fixedly installed on the side of the reduction gearbox facing the drive motor, and a central hole communicating with the reduction gearbox is fixedly installed in the center of the fixing plate; and when the output end of the drive motor is installed inside the reduction gearbox, it can limit and support the top and bottom of the drive motor.

* * * * *